2,741,864
CASTING FLOAT AND BAIT PLUG
John Clate Shotton, Lakewood, Ohio Application December 9, 1952, Serial No. 324,877

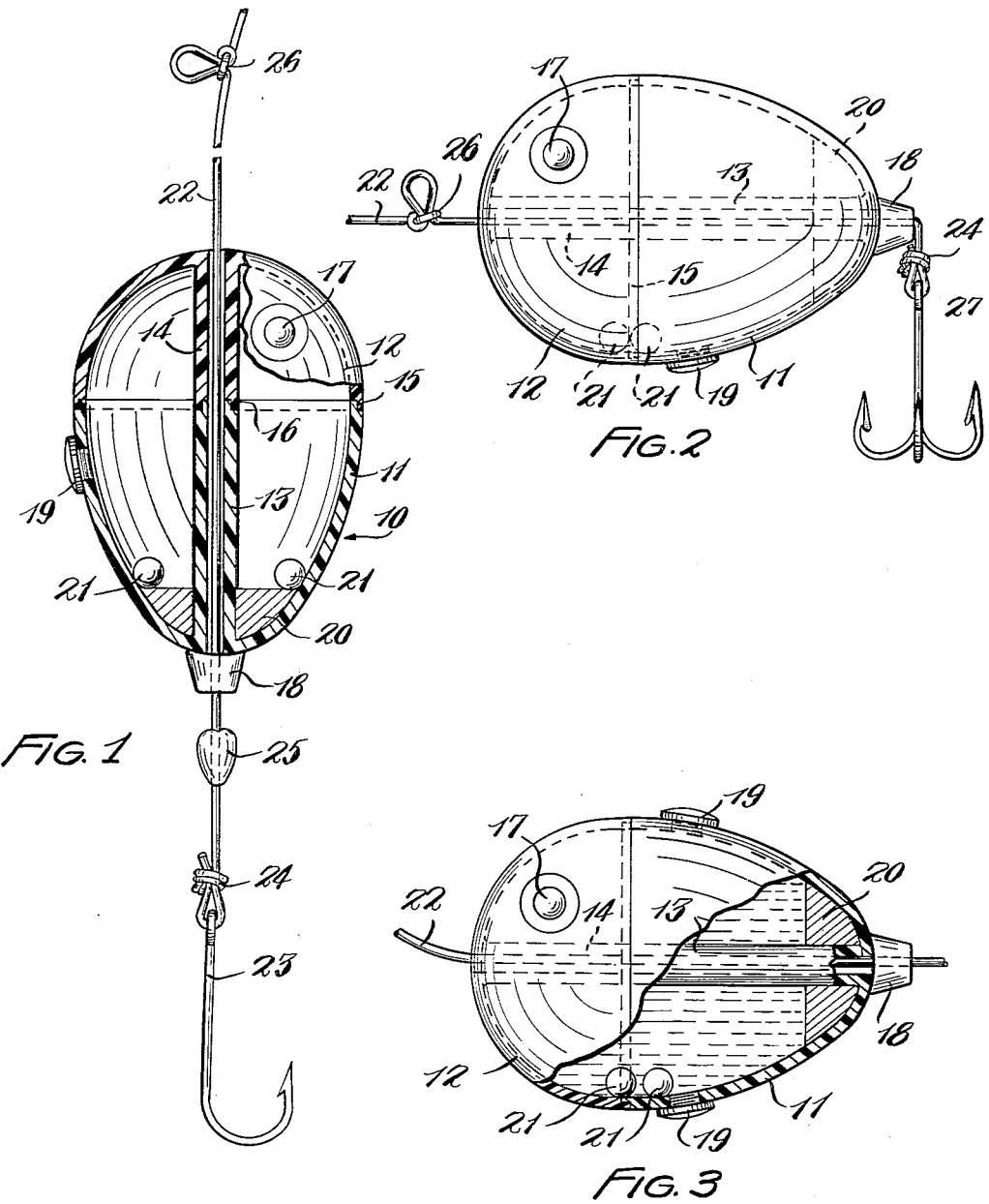

1 Claim. (Cl. 43—44.9)

This invention relates to a casting float and bait plug. An object of the invention is to provide a combined casting float and bait plug which can be efficiently used as a float in casting fishing or can be used with a positive or a negative buoyancy as a floating bait plug or as a submerged bait plug in trolling or similar fishing operations.

Another object is to provide a combined casting float and bait plug such as referred to in the preceding object and which is of simple, durable, economic construction; can be easily and quickly rigged on a fishing line; is so formed and balanced as to weight as to permit it to be readily cast; and which can be quickly converted from a casting float with positive buoyancy into a submerged bait plug having negative buoyancy.

A still further object is to provide a combined casting float and bait plug which embodies features that render it efficient in use and which increase the likelihood of the fisherman using the same being able to more effectively catch a greater number of fish.

Further and additional objects and advantages not hereinbefore referred to will become apparent hereinafter during the detailed description of an embodiment of the invention which is to follow and which embodiment is illustrated in the accompanying drawing forming part of this specification wherein, Fig. 1 is a central longitudinal sectional view through a combined float and bait plug embodying the invention with a portion of the exterior of the float and plug shown in elevation and with the float and plug rigged on a fishing line and having positive buoyancy, the rig of the float and plug on the fishing line being that used for casting.

Fig. 2 is an elevational view of the combined float and bait plug with the same rigged on a fishing line and having positive buoyancy, the rig being such as would be employed when the device is used as a floating bait plug such as in trolling surface water.

Fig. 3 is a view similar to Fig. 2 with portions broken away to illustrate the float and plug when given negative buoyancy as would be the case when used as a submerged bait plug for trolling operations.

The combined float and bait plug is illustrated as a substantially egg-shaped hollow container 10, although its over-all configuration can be varied, if desired. While the container 10 may be formed in various ways and of different suitable materials, either plastic, wood or metal, it will be described herein for purposes of illustration as formed of molded plastic material, since at this time this seems to be the preferred manner of economically and efficiently producing the device.

The container 10 comprises two parts 11 and 12 molded, in this instance, of a suitable plastic and each provided interiorly and centrally thereof with a longitudinally extending tubular portion, such portion of the part 11 being indicated at 13 and the portion of the part 12 being indicated at 14.

It will be observed that the shape of the parts 11 and 12, including the tubular portions 13 and 14 thereof, is such that said parts can be efficiently molded and the requisite draft provided for removing the molded parts from the mold.

The parts 11 and 12 are provided with cooperating interfitting annular shoulders 15, wherefore when the parts are placed together and integrated in a suitable manner, such as by heat, the exterior of the container will present a continuous smooth surface.

Similarly, the tubular portions 13 and 14 are provided with interfitting cooperating annular ribs and shoulders indicated at 16.

The exterior of the container 10 may have any desired color, preferably a bright color, while the exteriors of the parts 11 and 12 may have contrasting bright colors. Also both parts or only one part may be painted interiorly with a luminous paint, but preferably only the part 12 will be so painted.

The part 12 may be provided on its exterior with representations of eyes as indicated at 17. The part 11 at its small end may be provided exteriorly with an integral nipple portion 18 having a bore therethrough aligning with the bore through the tubular portion 13. The part 11 is provided with one or more threaded openings closed by headed closure screws indicated at 19, with at least one of the openings and screws located adjacent the underside of the part 11. The part 11 interiorly and adjacent its small end has arranged therein a predetermined mass 20 of lead or other similar heavy material which surrounds the tubular portion 13 and which imparts weight to the container to enable it to be cast and also to cause it to have the proper position in the water when used as a float.

It is recognized that fish have their curiosity aroused by strange noises and that even noises of small volume can be heard by a fish substantial distances through water. In view of this I mount within the container 10 one or more noise producing devices such as freely movable balls 21 formed of metal or any other suitable noise producing material. The balls 21 are free to move around within the container and will do so under the vibrations and movement imparted to the container when the same is being used for fishing purposes and these balls hitting against the interior of the container and against the weight mass 20 will create noises that will reverberate because of the hollow construction of the container and which noises can be heard by the fish at substantial distances through the water. Consequently fish will be attracted to the vicinity of the float or plug because of their curiosity to investigate strange sounds and, therefore, fish will come to the locality into which the container is cast or is positioned even though originally no fish were present in this particular area. It will thus be seen that the provision of the noise creating devices 21 will greatly increase the likelihood of a fisherman using the float or plug catching a greater number of fish.

The manner in which the device hereinbefore described may be employed will now be set forth, first with reference to its use as a float for casting fishing, then as a bait plug for bait trolling on the surface of the water, and then as a submerged bait plug for trolling below the surface of the water.

Referring to Fig. 1, a fish line 22 is shown as passed through the tubular portions 13 and 14 of the device. The fish line 22 beyond the nipple 18 is secured to a fish hook 23 in the well known manner by passing the line through the eyelet of the fish hook and knotting the same by a suitable knot as indicated at 24. A suitable sinker 25 can be secured on the fish line 22 intermediate the hook 23 and the nipple 18 of the float. The line 22 at the proper distance beyond the opposite end of the float is provided with a quickly releasable knot 26 well understood in the art, and the float 10 can move relative to the line 22 between the knot 26 and the sinker 25. The fisherman baits the hook 23 and with the float located adjacent to the sinker 25 casts the hook, sinker, float and line in the usual manner. In the casting operation the weight 20 within the float provides sufficient mass to enable the float to be readily cast. When the hook and float strike the water the float will assume a more or less upright position due to the weight or mass 20 and will remain on the surface because the float has positive buoyancy.

The line 22 will move through the tubular portions 13 and 14 of the float until the knot 26 is engaged by the upper end of the float. The float will have bobbing movement on the water and this will cause the balls 21 to roll around inside of the float and create noises that will attract fish to the vicinity of the float even though there are no fish there when the cast was made. The fish being thus attracted to the vicinity of the float and line more likely will take the bait on the hook 23. It will be understood that the location of the knot 26 is determined by the depth at which the fisherman wishes the baited hook 23 to be located in the water.

In Fig. 2 the device is shown as employed as a bait plug that is buoyant and is used for surface trolling. In this use of the device it is mounted on the fishing line 22 similar to the previously described use but said line has attached to its end a multiple barb fish hook 27. As the trolling operation draws the line 22 through the water the knot 24 will engage the nipple 18 of the device and the latter and the hook will move in unison during the trolling operation.

As already stated, the device may be brightly colored and the parts 11 and 12 thereof may be of contrasting colors with the part 12 also coated with luminous paint. As the device is drawn through the water along the surface thereof it will have the appearance of a small fish or sea animal and will induce fish in the locality to strike at the same. Also the noise created by the balls 21 will attract fish from a substantial distance to the locality where the trolling operation is being carried on and this will greatly increase the likelihood of fish striking the plug.

In Fig. 3 the device is illustrated as used as a submerged bait plug. In order to impart negative buoyancy to the device all that need be done is remove the headed screw 19 therefrom and fill or partially fill the device with water. If it is necessary to provide an additional opening for venting the air during the water filling operation the device may have openings formed therein on opposite sides of the device, as illustrated in Fig. 3, with each opening closed by a headed screw 19 as will be readily understood. As soon as sufficient water has been introduced into the device to give it negative buoyancy it will readily be understood that the device can be used as a submerged bait plug during trolling operations.

Although a preferred form of the invention has been illustrated and described herein it will be understood that the invention is susceptible of various modifications and adaptations within the scope of the appended claim.

Having thus described my invention, I claim:

A combined casting float and bait plug comprising a substantially hollow container formed of two sections of different size and shape secured together, said sections being of such size and shape as to form when secured together an egg-shaped hollow container, each of said sections being provided interiorly and centrally thereof with a tubular portion, the tubular portions of the sections when the latter are secured together aligning with each other and constituting a central tubular portion extending the longitudinal length of the egg-shaped container along its longitudinal center line, said container having an integral nipple formed exteriorly on the smaller section at the end thereof and having a passage therethrough located on the longitudinal center line of the container and communicating with said central tubular portion whereby a fishing line can slidably extend through the central tubular portion and said nipple, a weight mass within the smaller section and surrounding said tubular portion at the small end of said egg-shaped container, said smaller section being provided with an opening, whereby said container can have water introduced into its interior to give it negative or partial buoyancy when it is used as a bait plug or can have its interior emptied to give it positive buoyancy when it is used as a casting float, and a removable closure for said opening, said weight mass acting to maintain said container in substantially vertical position in the water with the larger section uppermost.

References Cited in the file of this patent

UNITED STATES PATENTS

| | | |
|---|---|---|
| 12,060 | Hoard | Dec. 12, 1854 |
| 786,597 | Picken | Apr. 4, 1905 |
| 790,301 | Jones | May 23, 1905 |
| 1,437,284 | Wagner | Nov. 28, 1922 |
| 1,804,084 | Blake | May 5, 1931 |
| 2,226,331 | Allison | Dec. 24, 1940 |
| 2,270,487 | Withey | Jan. 20, 1942 |
| 2,598,360 | Cummings | May 27, 1952 |
| 2,693,049 | Atton | Nov. 2, 1954 |

FOREIGN PATENTS

| | | |
|---|---|---|
| 123,384 | Sweden | Nov. 23, 1948 |